Oct. 19, 1965  D. K. PORTER  3,212,951
ADJUSTABLE BAND APPLIER
Filed Nov. 8, 1962  2 Sheets-Sheet 2
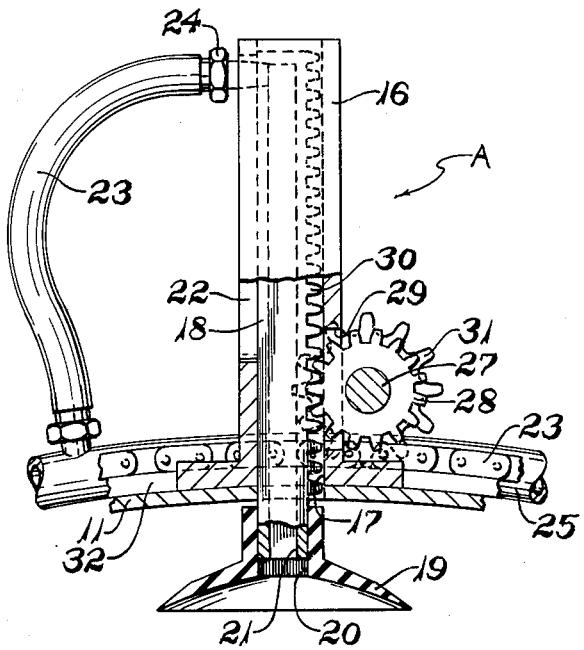
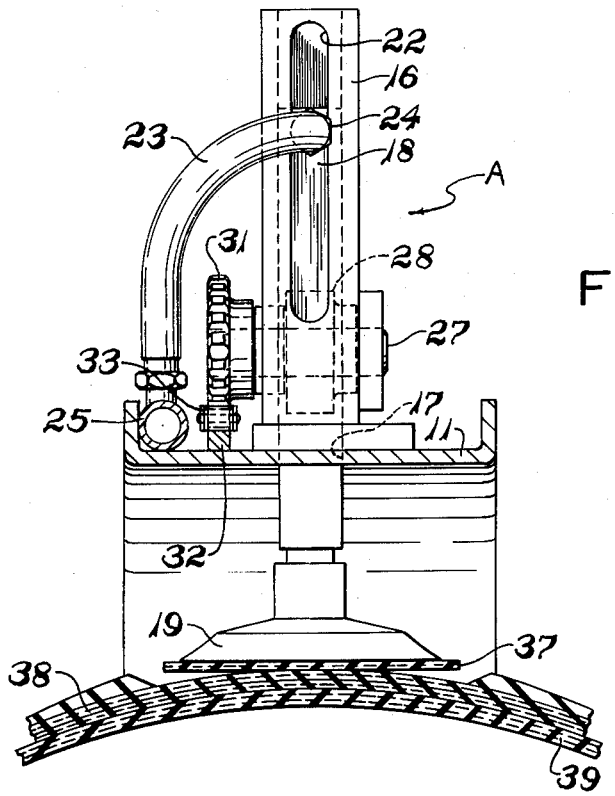
INVENTOR.
DONALD K. PORTER
BY
William L. Reeve
ATTY.

United States Patent Office 3,212,951
Patented Oct. 19, 1965

3,212,951
ADJUSTABLE BAND APPLIER
Donald K. Porter, Cuyahoga Falls, Ohio, assignor to The B. F. Goodrich Company, New York, N.Y., a corporation of New York
Filed Nov. 8, 1962, Ser. No. 236,322
6 Claims. (Cl. 156—394)

This apparatus pertains to the manufacture of inflatable vehicle tires and, more particularly, to the manufacture of those tires incorporating an inextensible band of radially disposed cord or wire material as an overhead member located between the main reinforcing plies and the tread material.

In the manufacture of vehicle tires having an inextensible overhead band, one of the major sources of defects in the finished tire results from distortion of the wire or cord reinforcement of the band during the band's application to the tire carcass.

Formerly, when the band was to be applied to the carcass the carcass was inflated causing the tire beads to approach one another and the outer central portion of the tire carcass to be inflated to a diameter closely approximating the inside diameter of the inextensible overhead band. The band was then applied to the inflated carcass by the use of conventional roller bars, a method well known to those experienced in the art. By using the roller bar the wire or cord reinforcement of the band usually became disoriented to some extent with respect to its desired and extremely critical design orientation, severe disorientation resulting in a defective product.

In view of the problems associated with the former methods of producing such tires, it became incumbent upon those concerned with the problem to devise an apparatus for placing the inextensible band about the tire carcass in such a manner that the band's reinforcing cords or wires remained in their desired orientation.

It is an object of this invention, therefore, to provide an apparatus for positioning inextensible overhead bands about a tire carcass prior to inflation of the carcass without disorientation of the band's reinforcing members.

It is another object of this invention to provide an apparatus for applying inextensible overhead bands to tire carcasses wherein the band is supported about its outer circumference by a plurality of supporting members which may be moved with the band to a position for encirclement of a tire carcass, and withdrawn from the peripheral surface of the band following inflation of the tire carcass to engagement with the band.

It is a further object of this invention is to provide an apparatus as disclosed in the preceding paragraph wherein the inextensible overhead band is supported by a plurality of flexible, band engaging members, mounted in equally spaced circumferential relationship to one another and for movement toward and away from the axis of the band.

It is a still further object of the invention to provide an apparatus as defined in the preceding paragraph wherein means are provided to draw a vacuum through the band engaging members to thereby retain said band against the members during the time the vacuum is applied.

Further objects and uses of the present invention will occur to those experienced in the art to which it pertains.

A presently preferred embodiment of the present invention is herein described with reference to the drawings, forming a part of this application, in which;

FIGURE 2 is a front elevational view, to an enlarged scale and partly in section, of the operating mechanism for moving one of the band engaging members to and from its band engagement position; and FIGURE 3 is a side elevational view, partly in section, of that portion of the apparatus shown in FIGURE 2.

Figure 1:
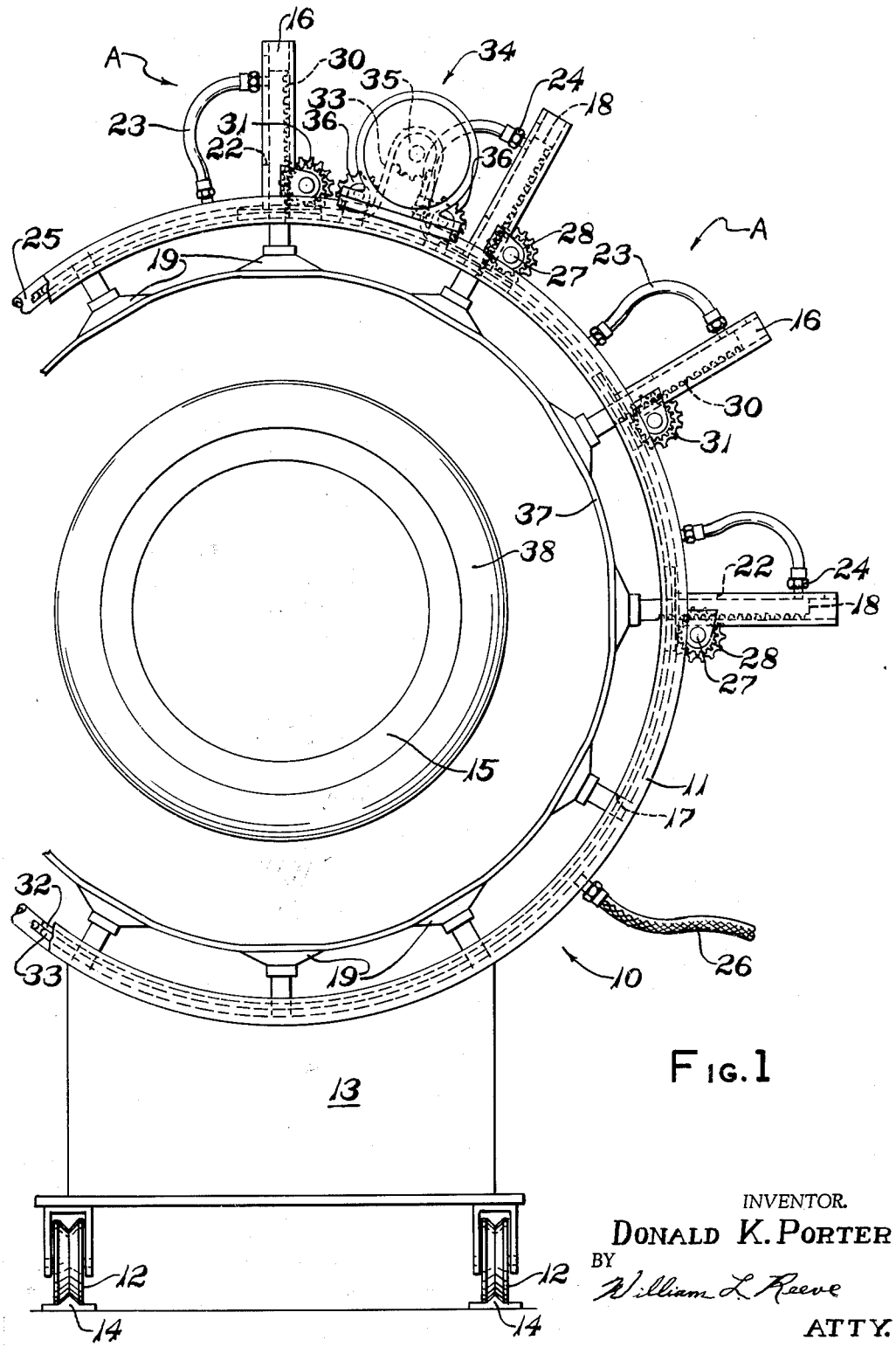
FIGURE 1 is a side elevational view of the apparatus shown in its band engaging position with reference to a tire building drum.

In its presently preferred embodiment, the apparatus 10 comprises a cylindrical frame 11 mounted on rotatable wheels 12 by means of a vertical support 13. The wheels 12 ride upon tracks 14 in such a manner that the apparatus 10 may be moved in the direction of its axis coaxially toward and away from a tire building drum 15.

Mounted about cylindrical frame 11 in equal, circumferentially spaced relationship are a plurality of band engaging assemblies A. Each of the assemblies A comprises a tubular member 16 projecting from frame 11 in radial fashion. A passageway 17 formed in frame 11 communicates the interior of tubular member 16 with the interior of frame member 11. Slideably mounted for movement within member 16 and passageway 17 is a second tubular member 18. Mounted on the end of tubular member 18 projecting into the interior of frame member 11 is a resilient, band engaging cup member 19. Cup member 19 has a central opening 20 formed therethrough allowing communication of the interior of cup member 19 with the interior passageway 21 of tubular member 18. The wall of tubular member 16 is provided with a vertically extending slot 22 through which a flexible hose 23 may be connected to the outer end of tubular member 18 by means of a fitting 24. The hose 23 from each assembly A is connected to a circular manifold 25 which is mounted about the periphery of frame member 11. Manifold 25 is connected by a hose 26 to a vacuum source not shown. Hose 26 must be of sufficient length to allow the desired travel of the apparatus 10 along tracks 14.

Near the lower end of each tubular member 16 and generally perpendicular thereto is mounted a rotatable shaft 27 disposed axially parallel to the axis of the apparatus 10. Keyed to shaft 27 is a pinion gear 28 which is engageable through an opening 29 formed in the lower end of tubular member 16 with a rack 30 formed on the outer surface of tubular member 18. Thus, as shaft 27 is rotated, tubular member 18 may be radially moved within member 16 with respect to the axis of the apparatus 10. Also mounted on shaft 27 is a sprocket gear 31. Held in contact with the underside of each sprocket gear 31, by means of a guide member 32, is an endless chain 33.

Near the upper portion of the apparatus 10 is mounted a chain drive unit 34 having a drive sprocket 35. Chain 33, which is in driving contact with all of the sprocket gears 31, is trained about drive sprocket 35; and is tensioned about the entire apparatus by means of adjustable tensioning sprockets 36. Thus, as drive unit 34 is operated, chain 33 may be driven in directions to raise or lower the band engaging cup members 19 with respect to the inextensible band 37 to be retained thereby.

In operating the machine, the band engaging cup members 19 are first retracted to their position shown in full line in FIGURE 3. The apparatus 10 is then moved to a position in which the cylindrical frame 11 coaxially encircles the overhead band 37 on its collapsible building form or storage rack, neither of which are shown. The drive unit 34 is then actuated to cause the cup members 19 to move radially inwardly to grip the outer surface of the band 37. Hose 26 is then connected, by means not shown, to a vacuum source, causing the band 37 to be drawn against cup members 19 and held thereto in undistorted relationship. The apparatus 10, with the band 37 engaged therein, is then moved axially with respect to a tire building drum 15 upon which a tire carcass 38 has been previously constructed. The operator positions the apparatus 10 such that the band 37 is centered with respect to a central plane perpendicular to the axis of the tire building drum. A bladder member 39 of the building drum 15 is then inflated to bring the tire carcass 38 into full engagement with the overhead band 37. At this point, the vacuum applied through hose 26 is discontinued, following which drive unit 34 is actuated to retract the band engaging members 19 away from the band 37.

It will be appreciated that in the manufacture of tires utilizing inextensible overhead bands which are formed of heavy wire, a vacuum need not be applied to the cup members 19. The mere lowering of the cup members 19 into firm engagement with the wire band 37 will be sufficient to adequately retain the band 37 in its proper circular configuration utilizing the inherent hoop strength of the band.

Structural modifications and changes in the use of the apparatus will occur to those experienced in the art to which it pertains within the spirit and scope of the invention as defined in the appended claims.

I claim:

1. Apparatus for applying an overhead band to a tire carcass in undistorted form comprising a base, said base having an annular support with a longitudinally extending axis, a plurality of circumferentially spaced members mounted on said annular support, said members having one end portion extending radially inwardly toward said axis, each of said one end portions having a band engaging member mounted thereon for supporting a circumferential portion of an overhead band, and means operatively connected to said spaced members for moving said spaced members simultaneously radially toward and away from said axis.

2. Apparatus for applying overhead bands to tire carcass in undistorted form, comprising a movable carriage; said carriage having an annular support with a longitudinally extending axis; a plurality of circumferentially spaced members mounted on said annular support for movement toward and away from said axis; one end portion of each of said members positioned inwardly of said annular support and the other end portion of said each member positioned outwardly of said annular support; means operatively connected to said spaced members operative for moving simultaneously said spaced members radially toward and away from said axis; and each of said spaced members having a band engaging member mounted on said one end portion for supporting a portion of such overhead band.

3. An apparatus for applying in undistorted form an overhead band to a tire carcass mounted on an inflatable drum comprising a movable carriage, said carriage having an annular support, a plurality of overhead band engaging members mounted on said support, means on said support operative to move said engaging members toward and away from the axis of said annular support, and means to draw a vacuum through said band engaging members.

4. Apparatus for applying in undistorted form overhead bands to a tire carcass formed about an inflatable tire building drum, comprising a plurality of flexible overhead band engaging members movably mounted on said apparatus, motive means operatively connected with each of said engaging members operable to move its respective engaging member toward and away from an axis of said apparatus, means to operate said motive means jointly, means to draw a vacuum through said engaging means, and means mounting said apparatus for movement along said axis coaxially relative to a tire building drum.

5. An apparatus for applying in undistorted form an overhead band to an inflatable tire carcass comprising a carriage, means mounting said carriage for movement in a longitudinal direction, said carriage supporting a cylindrical frame member, said frame member having a plurality of circumferentially spaced band engaging members, rack and pinion means operatively connected to each of said band engaging members operable for moving said engaging members toward and away from the axis of said frame member, and drive means operatively connected to each of said rack and pinion means for actuating said rack and pinion means to move engaging members.

6. An apparatus as set forth in claim 5 wherein each of said engaging members is cup shaped, and means to draw a vacuum is operatively connected to each of said cup shaped engaging members whereby said cup shaped engaging members support a band by vacuum on the circumferential surface thereof.

References Cited by the Examiner
UNITED STATES PATENTS

| 2,480,811 | 8/49 | McCoy | 156—126 |
| 2,501,644 | 3/50 | Kraft et al. | 156—126 |
| 2,517,889 | 8/50 | Kuffler | 156—394 |
| 2,871,912 | 2/59 | Kraft | 156—126 |
| 2,936,813 | 5/60 | Haase | 156—126 |

ALEXANDER WYMAN, *Primary Examiner.*

HAROLD ANSHER, *Examiner.*